United States Patent [19]

Lau

[11] Patent Number: 5,066,941

[45] Date of Patent: Nov. 19, 1991

[54] INTERNAL KEY-IN-IGNITION-WARNING/IGNITION SWITCH

[75] Inventor: Daniel Lau, Canton, Mich.

[73] Assignee: United Technologies Automotive, Dearborn, Mich.

[21] Appl. No.: 603,980

[22] Filed: Oct. 23, 1990

[51] Int. Cl.[5] ............................................ B60Q 1/00

[52] U.S. Cl. .................................. 340/457; 340/438; 307/10.3

[58] Field of Search ............... 340/457, 542, 543, 438; 307/10.3, 10.6, 9.1, 10.1, 10.2; 70/441, 432, 434, DIG. 59

[56] References Cited

U.S. PATENT DOCUMENTS

| | | | |
|---|---|---|---|
| 3,641,489 | 2/1972 | Shimomura | 340/457 |
| 3,646,511 | 2/1972 | Holt | 340/457 |
| 3,654,600 | 4/1972 | Yamamoto | 340/457 |
| 3,703,704 | 11/1972 | Schiesterl | 340/457 |

*Primary Examiner*—Jin F. Ng

*Assistant Examiner*—C. Oda

*Attorney, Agent, or Firm*—Troxell K. Snyder

[57] ABSTRACT

A key-in-ignition warning switch (10) is integrally mounted within an ignition switch (11). The warning switch (10), positioned along the rotational axis (17) of the ignition switch (10), comprises an inner plunger (15), an outer plunger (16), a plunger spring (28), and a housing spring (31). As the ignition key (26) is inserted into the key cylinder (12), a linkage (14) between the key cylinder (12) and the warning switch (10) pushes against the inner plunger (15), which in turn pushes against the outer plunger (16). As the key (26) is inserted completely into the key cylinder (12), contacts (24,25) attached to the plungers (15,16) make contact with terminals (34,36) located within a terminal block (35) attached to the ignition switch (11). When both plunger contacts (24,25) and mating terminals (34,36) are in contact, the key-in-ignition warning circuit is completed, thereby enabling the associated warning devices.

4 Claims, 1 Drawing Sheet

FIG. 2
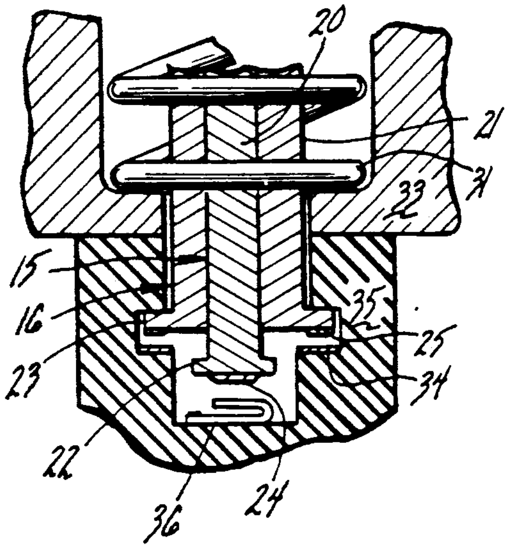
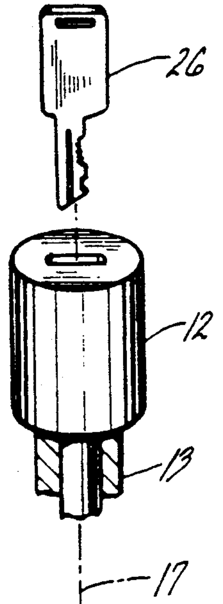
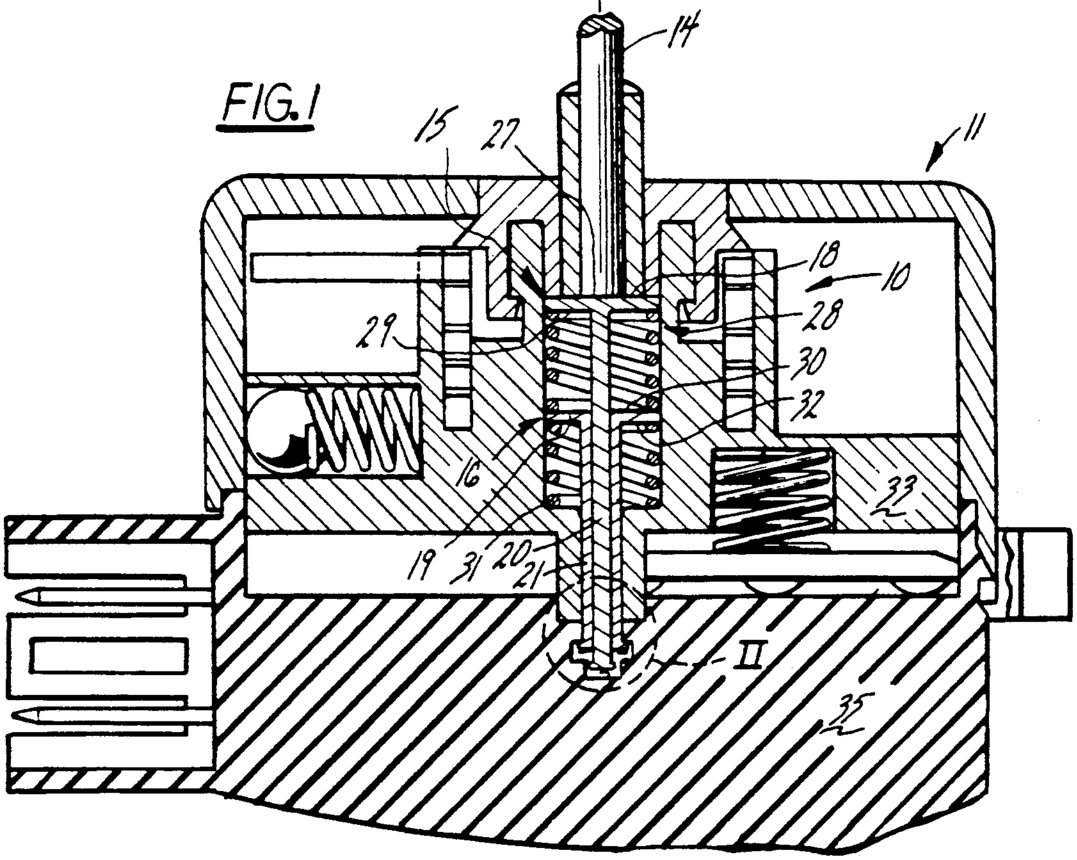
FIG. 1

INTERNAL KEY-IN-IGNITION-WARNING/IGNITION SWITCH

TECHNICAL FIELD

The present invention relates to automotive ignition switches and more particularly to ignition switches with "key-in-warning" safety switches internal to the ignition switch.

BACKGROUND ART

For both safety and security reasons, automotive manufacturers in recent years have included "key-in-ignition" warning devices in most vehicle models. These devices, which employ either an audible or visual warning, or both, typically are independent of the electrical ignition switch, a component of the ignition switch mechanism.

Typically, the ignition switch mechanism comprises a mechanical key cylinder, an electrical ignition switch, an electrical "key-in-ignition" warning switch, and mechanical linkages connecting these devices. The key cylinder allows the user to operate the ignition switch when the correct key is inserted. The ignition switch is then operated via the linkage when the key cylinder is rotated. Completely inserting the key into the ignition enables the warning device(s) in the "key-in-ignition" circuit and subsequently activates the warning if the driver's door opens prior to the key being removed.

Prior art methods of actuating the "key-in-ignition" warning switch have included mechanical devices operating in conjunction with they key cylinder of the ignition assembly. The mechanical device, for example a rod and clip assembly, would typically extend through the steering column of the auto and actuate the "key-in-ignition" switch independent of the ignition switch.

One of the disadvantages of this type of system is the necessity of separate switches for both the ignition and the "key-in-ignition" warning system. Two switches translates into additional assembly time to mount the switches, twice the mounting hardware, and an increase in cost associated with using two switches.

DISCLOSURE OF THE INVENTION

Objects of the present invention include provision of a "key-in-ignition" warning switch integral to the ignition switch of an automotive ignition switch assembly.

According to one aspect of the present invention, a "key-in-ignition" warning switch is provided integrally attached to the ignition switch of an automotive ignition switch mechanism. The "key-in-ignition" warning switch comprises a two spring twin plunger assembly which includes an inner plunger, an outer plunger, a plunger spring, and a housing spring. The warning switch is integrally positioned on center within the ignition switch such that when the ignition switch and key cylinder rotate, the warning switch pivots about the same rotational axis. Therefore, no asymmetric linkage and consequent packaging problem, between the warning switch and the key cylinder, is required.

As the ignition key begins to enter the key cylinder, a shaft between the key cylinder and the plunger assembly begins depressing the inner plunger. As it depresses, the inner plunger presses against the plunger spring located coaxially between the inner and outer plungers. Consequently, the outer plunger depresses and pushes against the housing spring, which is located coaxially between the outer plunger and the housing. As the key moves further into the key cylinder, either the inner or the outer plunger will "bottom out" and contact a terminal within the attached terminal block. At this point, one of two contacts to be made by the switch is completed.

As the key is inserted still further into the key cylinder, the remaining plunger continues to move, finally bottoming out and making contact with the terminal block thereby completing the circuit. The two contacts made by the present invention represent a positive lead and a ground lead. This type arrangement creates a self-grounding switch which is a desirable safety feature.

Advantages of the present invention include the elimination of the necessity of an independent switch for the "key-in-ignition" warning circuit. One less switch, and therefore one less mounting to design, translates into a savings in both material and design cost.

A further advantage of the present invention is the savings in space associated with one dual function switch versus two independent switches. Modern automotive design tends to incorporate increasing numbers of electrical device controls in the steering column of automobiles. As a result, space within the column is at a premium. The present invention's incorporation of two switches into one and the elimination of the requisite mechanical linkage of an independent warning switch helps alleviate the problem.

BRIEF DESCRIPTION OF THE DRAWINGS

FIG. 1 is a sectional view of the ignition switch with the "key-in-ignition" warning switch integrally attached, centered on the rotational axis of the ignition switch.

FIG. 2 is an enlargement of the contacts section of the plunger assembly.

BEST MODE FOR CARRYING OUT THE INVENTION

Referring now to FIG. 1 and 2, an electrical "key-in-ignition" warning switch 10 represents one sub-assembly in an automotive ignition switch mechanism. Also included in the ignition switch mechanism are an electrical ignition switch 11, a mechanical key cylinder 12, and mechanical linkages 13,14 connecting these devices.

The "key-in-ignition" switch 10 includes concentric inner 15 and an outer 16 plungers centered on the rotational axis 17 of the ignition switch 11. Both inner and outer plungers 15,16 comprise a cap end 18,19, a shaft midsection 20,21, and a shaft flange 22,23 on the end opposite the cap end 18,19, respectively. The plungers 15,16 connect together in a slide fit between the plunger shafts 20,21. The inner plunger shaft 20 extends through the bore inside the outer plunger shaft 21. When the plungers 15,16 are assembled, the plunger cap ends 18,19 are positioned on the same side of the switch 10. A first flange 22 on the end of the inner plunger 15 opposite the cap end 18 prevents the shaft 20 from sliding out of the outer plunger shaft 21. In addition, a second flange 23 on the end of the outer plunger 16 opposite the cap end 19 prevents the warning switch 10 from being pulled axially out of the ignition switch 11. Electrical contacts 24,25 are attached to the outside surface of the flange 22,23 of each plunger 15,16.

The center shaft 14 linkage segment between the key cylinder 12 and the ignition switch 11, the center shaft 14, is set into motion as the ignition key 26 begins to enter the key cylinder 12. The remaining linkage segment, the outer shaft 13, rotates the ignition switch 11 after the key 26 has been inserted completely and rotated. The center shaft 14 engages the warning switch 10 by pushing the outside surface 27 of the inner plunger cap end 18. In this case, the warning switch 10 is silver plated to promote conductivity. The plunger spring 28, located between the shaft side 29 of the inner plunger cap end 18 and the outside surface 30 of the outer plunger cap end 19, resists the force presented by the center shaft 14 and consequently pushes against the outer plunger 16. Similar to the plunger spring 28, the housing spring 31, located between the shaft side 32 of the outer plunger cap end 19 and the housing 33, resists the force imposed on the outer plunger 16. Eventually as the key 26 continues to move into the key cylinder 12, the housing spring 31, in this example, collapses enough to allow the first contacts 25 on the outer plunger flange 18 to make contact with the first mating terminals 34 positioned within the attached terminal block 35. At this point, the key 26 has not been fully inserted into the key cylinder 12.

As the key 26 is inserted still further, the inner plunger 15 continues to depress until the second contact 24 on the inner shaft flange end 22 makes contact with the second mating terminal 36 within the terminal block 35. Effectively, the warning switch 10 connects the first mating terminal 34 to the second mating terminal 36 thereby completing the key-in-ignition warning circuit. As a result, the "key-in-ignition" warning devices are enabled and will activate if the driver's door is opened prior to removing the ignition key 26.

I claim:

1. A key-in-ignition warning switch integrally attached to a rotatable in a housing ignition switch, said warning switch positioned concentric with the rotational axis of the ignition switch, wherein said warning switch rotates with the ignition switch, comprises:

an outer plunger having a cap end, a shaft midsection, and a first shaft flange attached to the end opposite said outer plunger cap end, wherein said first shaft flange includes a first electrical contact surface, and wherein said outer plunger includes a bore extending through said shaft midsection;

an inner plunger which comprises a cap end, a shaft midsection, and a second shaft flange attached to the end opposite said inner plunger cap end, wherein said second shaft flange includes a second electrical contact surface, and wherein said inner plunger extends through said bore a plunger spring positioned between the shaft side of said inner plunger cap end and the outside surface of said outer plunger cap end, and wherein said plunger spring is concentric with said inner plunger; and a housing spring positioned between the shaft side of said outer plunger cap end and the housing, and wherein said housing spring is concentric with said plungers.

2. The key-in-ignition warning switch according to claim 1, wherein said inner plunger, outer plunger, plunger spring, and housing spring are silver plated.

3. A key-in-ignition warning switch integrally attached to a rotatable in a housing ignition switch, said warning switch positioned concentric with the rotational axis of the ignition switch, wherein said warning switch rotates with the ignition switch, comprises:

an outer plunger having a cap end, a shaft midsection, and a first shaft flange attached to the end opposite said outer plunger cap end, wherein said first shaft flange includes a first electrical contact surface, and wherein said outer plunger includes a bore extending through said outer plunger shaft midsection;

an inner plunger which comprises a cap end, a shaft midsection, and a second shaft flange attached to the end opposite said inner plunger cap end, wherein said second shaft flange includes a second electrical contact surface, and wherein said inner plunger extends through said bore;

a plunger spring positioned between the shaft side of said inner plunger cap end and the outside surface of said outer plunger cap end, and wherein said plunger spring is concentric with said inner plunger;

a housing spring positioned between the shaft side of said outer plunger cap end and the housing, and wherein said housing spring is concentric with said plungers; and a mechanical linkage between the key cylinder and said warning switch comprising a center shaft linearly slidable for engaging said warning switch in response to the insertion of the ignition key into the key cylinder, and an outer shaft rotatable with the key cylinder and coupled to said ignition switch.

4. The key-in-ignition warning switch according to claim 3, wherein said inner plunger, outer plunger, plunger spring, and housing spring are silver plated.

* * * * *